(12) United States Patent
Otsuki et al.

(10) Patent No.: US 7,211,203 B2
(45) Date of Patent: May 1, 2007

(54) POLYMER ELECTROLYTE, PROTON CONDUCTIVE MEMBRANE AND MEMBRANE-ELECTRODE ASSEMBLY

(75) Inventors: Toshihiro Otsuki, Tokyo (JP); Nagayuki Kanaoka, Wako (JP); Masaru Iguchi, Wako (JP); Naoki Mitsuta, Wako (JP); Hiroshi Soma, Wako (JP)

(73) Assignees: Honda Motor Co., Ltd., Tokyo (JP); JSR Corporation, Tokyo (JP)

( * ) Notice: Subject to any disclaimer, the term of this patent is extended or adjusted under 35 U.S.C. 154(b) by 410 days.

(21) Appl. No.: 10/768,151

(22) Filed: Feb. 2, 2004

(65) Prior Publication Data

US 2004/0149965 A1    Aug. 5, 2004

(30) Foreign Application Priority Data

Feb. 4, 2003    (JP)    ............................. 2003-027268

(51) Int. Cl.
| | |
|---|---|
| H01B 1/00 | (2006.01) |
| C08G 63/44 | (2006.01) |
| C01G 18/77 | (2006.01) |
| C01G 63/00 | (2006.01) |
| C01G 12/00 | (2006.01) |

(52) U.S. Cl. ......................... 252/500; 528/363; 528/73; 528/183; 528/229; 528/423; 528/170; 429/33

(58) Field of Classification Search ............... 528/363, 528/73, 183, 229, 423, 170; 429/33; 252/500
See application file for complete search history.

(56) References Cited

U.S. PATENT DOCUMENTS

| | | | | |
|---|---|---|---|---|
| 3,259,592 | A | * | 7/1966 | Fox et al. ...................... 521/30 |
| 3,484,293 | A | | 12/1969 | Hodgdon, Jr. |
| 4,110,265 | A | | 8/1978 | Hodgdon |
| 5,221,482 | A | | 6/1993 | Maeda |
| 5,312,876 | A | | 5/1994 | Dang et al. |
| 5,403,675 | A | | 4/1995 | Ogata et al. |
| 5,525,436 | A | | 6/1996 | Savinell et al. |
| 5,599,639 | A | | 2/1997 | Sansone et al. |
| 5,795,496 | A | | 8/1998 | Yen et al. |
| 6,812,290 | B2 | * | 11/2004 | Goto et al. .................. 525/242 |
| 2001/0020082 | A1 | | 9/2001 | Faure et al. |
| 2002/0045729 | A1 | | 4/2002 | Kerres et al. |
| 2003/0013817 | A1 | | 1/2003 | Lu |

FOREIGN PATENT DOCUMENTS

| | | |
|---|---|---|
| EP | 1 245 554 A1 | 10/2002 |
| EP | 1 348 716 A1 | 10/2003 |
| JP | 53-23398 | 3/1978 |
| WO | WO 00/44816 | 8/2000 |
| WO | WO 02/070592 A2 | 9/2002 |

OTHER PUBLICATIONS

O.Savadogo; "Emerging Membranes for Electrochemical Systems: (I) Solid Polymer Electrolyte Membranes for Fuel Cell Systems"; Mar. 10, 1998; pp. 47-68.
Kenji Miyatake, et al; "Synthesis of Poly (phenylene sulfide sulfonic acid) via Poly (sulfonium cation) as a Thermostable Proton-Conducting Polymer"; Jul. 22, 1996; pp. 6969-6971.
(C) Derwent Publications; 2002-316330; Univ. Shanghai Jiaotong.
(C) Derwent; 1978-28042A; Teijin Ltd.

* cited by examiner

Primary Examiner—Mark Kopec
Assistant Examiner—Jaison Thomas
(74) Attorney, Agent, or Firm—Arent Fox LLP

(57) ABSTRACT

Disclosed are a polymer electrolyte having improved hot water resistance and radical resistance, a proton conductive membrane comprising the polymer electrolyte, and a membrane-electrode assembly including the proton conductive membrane.

The polymer electrolyte comprises at least one polymer selected from polyether, polyketone, polyetherketone, polysulfone, polyethersulfone, polyimide, polyetherimide, polybenzimidazole, polybenzothiazole, polybenzoxazole and the like. The polymer comprises a repeating structural unit with either or both of an aromatic ring and a heterocyclic ring, and a repeating structural unit represented by the formula (1):

(1)

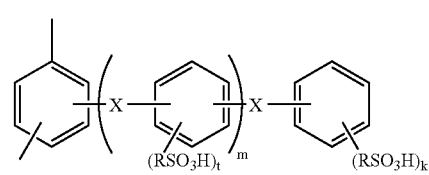

wherein X is a single bond, an electron-withdrawing group or an electron-donating group; R is a single bond, $-(CH_2)_q-$ or $-(CF_2)_q-$ where q ranges from 1 to 10; m is from 0 to 10; k is from 0 to 5; l is from 0 to 4; and $k+l \geq 1$.

4 Claims, No Drawings

POLYMER ELECTROLYTE, PROTON CONDUCTIVE MEMBRANE AND MEMBRANE-ELECTRODE ASSEMBLY

FIELD OF THE INVENTION

The present invention relates to a solid polymer electrolyte, a proton conductive membrane comprising the polymer electrolyte, and a membrane-electrode assembly. They have excellent resistances to oxidation and hot water and are favorably used in fuel cells, electrolysis of water or salt, humidity sensors, gas sensors and the like.

BACKGROUND ART

Solid polymer electrolytes are solid polymeric materials having electrolyte groups, such as sulfonic acid or carboxylic acid groups, in their polymer chains. They are capable of forming strong bonds with specific ion species and have selective permeability to cations or anions. With such properties, those solid polymer electrolytes are used as polymer electrolyte membranes in polymer electrolyte fuel cells and water electrolysis cells.

The polymer electrolyte fuel cells have a proton conductive solid polymer electrolyte membrane and a pair of electrodes sandwiching the electrolyte membrane. They produce electricity when a fuel gas, which is pure or modified hydrogen gas, is supplied to one electrode (fuel electrode) and an oxidizing agent, which is oxygen gas or air, is delivered to the other electrode (oxygen electrode). The water electrolysis is the reverse reaction of the fuel cell reaction; it produces hydrogen and oxygen by electrolyzing water using a solid polymer electrolyte membrane.

The practical fuel cell reactions and water electrolysis involve side reactions, typically generation of hydrogen peroxide ($H_2O_2$). Radical species derived from the hydrogen peroxide cause deterioration of the solid polymer electrolyte membranes.

The solid polymer electrolyte membranes of conventional use, due to their excellent chemical stability, are those perfluorosulfonic acid electrolyte membranes commercially available under the trademarks of Nafion (Dupont), Aciplex (Asahi Kasei Corporation) and Flemion (Asahi Glass Co., Ltd).

However, those perfluorosulfonic acid electrolyte membranes are difficult to produce and thus are very expensive. This cost problem has been one of the big impediments to civilian applications including automobiles and household fuel cells. Accordingly, their use has been limited to specific applications. Further, when discarded after use, the perfluorosulfonic acid membranes cause serious environmental problems since they contain large amounts of fluorine atoms in their molecules.

As such, solid polymer electrolyte membranes that are less expensive and fluorine free have been developed. Those membranes comprise polymers such as polyetheretherketone, polyethersulfone and polyphenylenesulfide that have been sulfonated in an aromatic ring in the main chain. However, such polymers with a sulfonated aromatic ring in the main chain have high water absorption property, are poor in hot water resistance, and have insufficient Fenton's reagent resistance (radical resistance) that is a measure of the service durability in electricity generation.

OBJECT OF THE INVENTION

The present invention intends to solve the aforesaid problems related to the traditional aromatic hydrocarbon electrolyte membranes. Accordingly, it is an object of the invention to provide a solid polymer electrolyte that has improved hot water resistance and radical resistance (service durability), a proton conductive membrane comprising the polymer electrolyte, and a membrane-electrode assembly including the proton conductive membrane.

SUMMARY OF THE INVENTION

To achieve the above object, the invention provides the following:

(1) A polymer electrolyte comprising at least one polymer selected from polyether, polyketone, polyetherketone, polysulfone, polyethersulfone, polyimide, polyetherimide, polybenzimidazole, polybenzothiazole, polybenzoxazole, polyphenylenesulfide, polyhydantoin, polyquinoxaline, polyquinoline, polyoxadiazole and polyparabanic acid, said polymer comprising a repeating structural unit having one or both of an aromatic ring and a heterocyclic ring and a repeating structural unit represented by the formula (1):

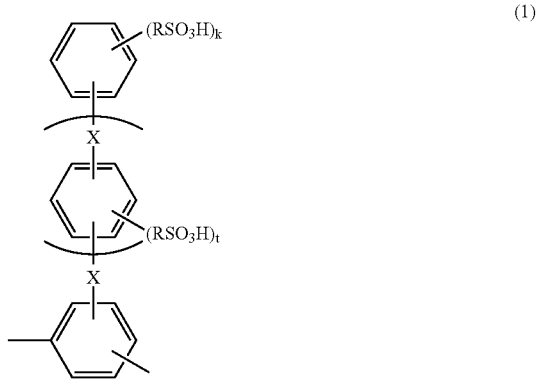

wherein X denotes a single bond, an electron-withdrawing group or an electron-donating group; R denotes a single bond, $-(CH_2)_q-$ or $-(CF_2)_q-$ where q ranges from 1 to 10; m denotes an integer of 0 to 10 and when m is from 1 to 10 Xs may be the same as or different from one another; k denotes an integer of 0 to 5; l denotes an integer of 0 to 4; and $k+l \geq 1$.

(2) The polymer electrolyte according to (1), containing the sulfonic acid group in an amount of 0.3 to 5.0 meq/g.

(3) A proton conductive membrane comprising the polymer electrolyte as described in (1) or (2).

(4) A membrane-electrode assembly in which an electrolyte membrane is sandwiched between a pair of electrodes, said electrolyte membrane comprising at least one polymer selected from polyether, polyketone, polyetherketone, polysulfone, polyethersulfone, polyimide, polyetherimide, polybenzimidazole, polybenzothiazole, polybenzoxazole, polyphenylenesulfide, polyhydantoin, polyquinoxaline, polyquinoline, polyoxadiazole and polyparabanic acid, said polymer comprising a repeating structural unit having one or both of an aromatic ring and a heterocyclic ring and a repeating structural unit represented by the formula (1):

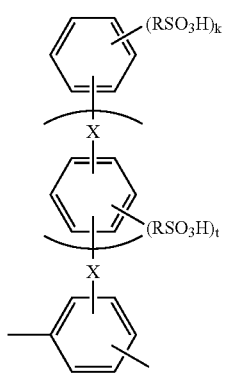

(1)

wherein X denotes a single bond, an electron-withdrawing group or an electron-donating group; R denotes a single bond, $-(CH_2)_q-$ or $-(CF_2)_q-$ where q ranges from 1 to 10; m denotes an integer of 0 to 10 and when m is from 1 to 10 Xs may be the same as or different from one another; k denotes an integer of 0 to 5; l denotes an integer of 0 to 4; and $k+l \geqq 1$.

BEST MODE FOR CARRYING OUT THE INVENTION

Hereinbelow, the polymer electrolyte, proton conductive membrane and membrane-electrode assembly according to the invention will be described.

The polymer electrolyte of the invention comprises one or more sulfonated polymers. The sulfonated polymers may be selected from polyether, polyketone, polyetherketone, polysulfone, polyethersulfone, polyimide, polyetherimide, polybenzimidazole, polybenzothiazole, polybenzoxazole, polyphenylenesulfide, polyhydantoin, polyquinoxaline, polyquinoline, polyoxadiazole and polyparabanic acid. The one or more sulfonated polymers each comprise a repeating structural unit having one or both of an aromatic ring and a heterocyclic ring, and also a repeating structural unit represented by the formula (1):

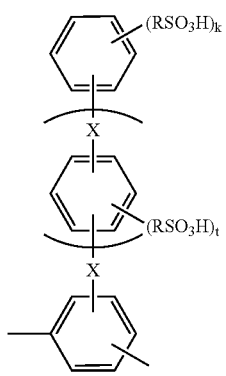

(1)

The repeating structural units with either or both of aromatic and heterocyclic rings (hereinafter the "specific repeating structural units") that partially make up the sulfonated polymer include:

Ethers having the formula (2):

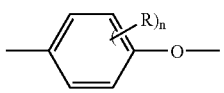

(2)

wherein R denotes hydrogen or an organic group such as alkyl or aromatic group, and n ranges from 0 to 4;

Ketones having the formula (3):

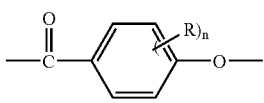

(3)

wherein R denotes hydrogen or an organic group such as alkyl or aromatic group, and n ranges from 0 to 4;

Sulfones having the formula (4):

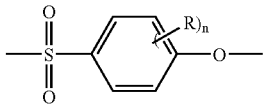

(4)

wherein R denotes hydrogen or an organic group such as alkyl or aromatic group, and n ranges from 0 to 4;

Imides having the formula (5):

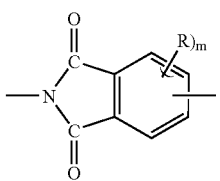

(5)

wherein R denotes hydrogen or an organic group such as alkyl or aromatic group, and m ranges from 0 to 3;

Benzimidazoles having the formula (6):

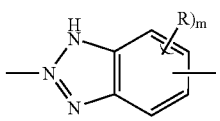

(6)

wherein R denotes hydrogen or an organic group such as alkyl or aromatic group, and m ranges from 0 to 3;

Benzothiazoles having the formula (7):

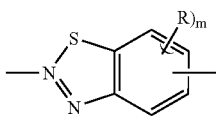

(7)

wherein R denotes hydrogen or an organic group such as alkyl or aromatic group, and m ranges from 0 to 3;

Benzoxazoles having the formula (8):

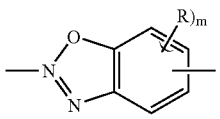
(8)

wherein R denotes hydrogen or an organic group such as alkyl or aromatic group, and m ranges from 0 to 3;

Phenylenesulfides having the formula (9):

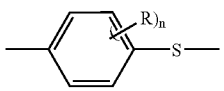
(9)

wherein R denotes hydrogen or an organic group such as alkyl or aromatic group, and n ranges from 0 to 4;

Hydantoins having the formula (10):

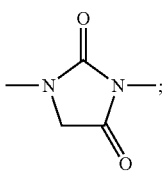
(10)

Quinoxalines having the formula (11):

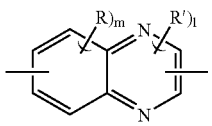
(11)

wherein R and R' each denote hydrogen or an organic group such as alkyl or aromatic group, m ranges from 0 to 3, and l is 0 or 1;

Quinolines having the formula (12):

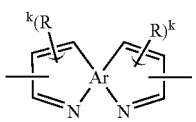
(12)

wherein R denotes hydrogen or an organic group such as alkyl or aromatic group, and k ranges from 0 to 2; and Parabanic acids having the formula (13):

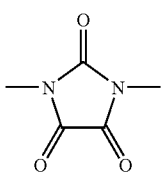
(13)

Exemplary organic groups indicated by R in the formulae (2) to (9), (11) and (12) include methyl, ethyl, propyl, butyl, amyl and hexyl groups for the alkyl groups, and phenyl and p-tolyl groups for the aromatic groups.

Of the specific repeating structural units illustrated above, those having the formulae (4), (6) to (8), and (10) to (13) are preferable.

The sulfonated polymer may contain two or more kinds of the specific repeating structural units at the same time.

Exemplary sulfonated polymers containing these specific repeating structural units include aromatic polyether, aromatic polyketone, aromatic polyetherketone, aromatic polyetheretherketone, aromatic polysulfone, aromatic polyethersulfone, aromatic polyimide, aromatic polyetherimide, polybenzimidazole, polybenzothiazole, polybenzoxazole, polyphenylenesulfide, polyhydantoin, polyquinoxaline, polyquinoline, polyoxadiazole and polyparabanic acid. Of these, aromatic polysulfone, aromatic polyethersulfone, polybenzimidazole, polybenzoxazole, polyhydantoin, polyquinoxaline, polyquinoline, polyoxadiazole and polyparabanic acid are preferable.

In the above formula (1), X denotes a single bond (—), an electron-withdrawing group or an electron-donating group. The electron-withdrawing groups include —CO—, —SO$_2$—, —SO—, —CONH—, —COO—, —(CF$_2$)$_p$— (wherein p ranges from 1 to 10) and —C(CF$_3$)$_2$—. The electron-donating groups include —(CH$_2$)—, —C(CH$_3$)$_2$—, —O— and —S—.

The electron-withdrawing group may be defined as having a Hammett substituent constant of not less than 0.06 at the m-position of a phenyl group arid not less than 0.01 at the p-position.

Referring to the formula (1), R denotes a single bond (—), —(CH$_2$)$_q$— or —(CF$_2$)$_q$— where q is from 1 to 10; m ranges from 0 to 10, preferably 0 to 8, and more preferably 0 to 5; k ranges from 0 to 5 and l ranges from 0 to 4 with the proviso that k+l≧1.

When m is an integer of 1 to 10, Xs may be the same as or different from one another.

Preferably, k will be an integer from 1 to 4, l from 0 to 3, and m from 0 to 5.

The following are exemplary repeating structural units of the formula (1) in which R is a single bond, —(CH$_2$)$_q$— or —(CF$_2$)$_q$—:

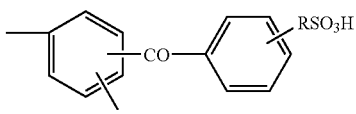

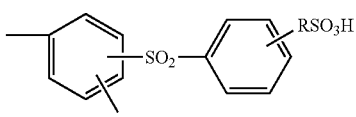

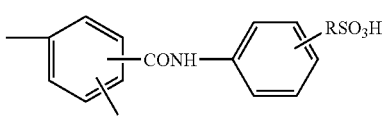

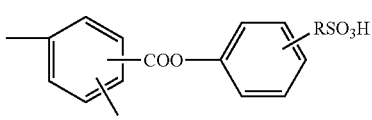

-continued

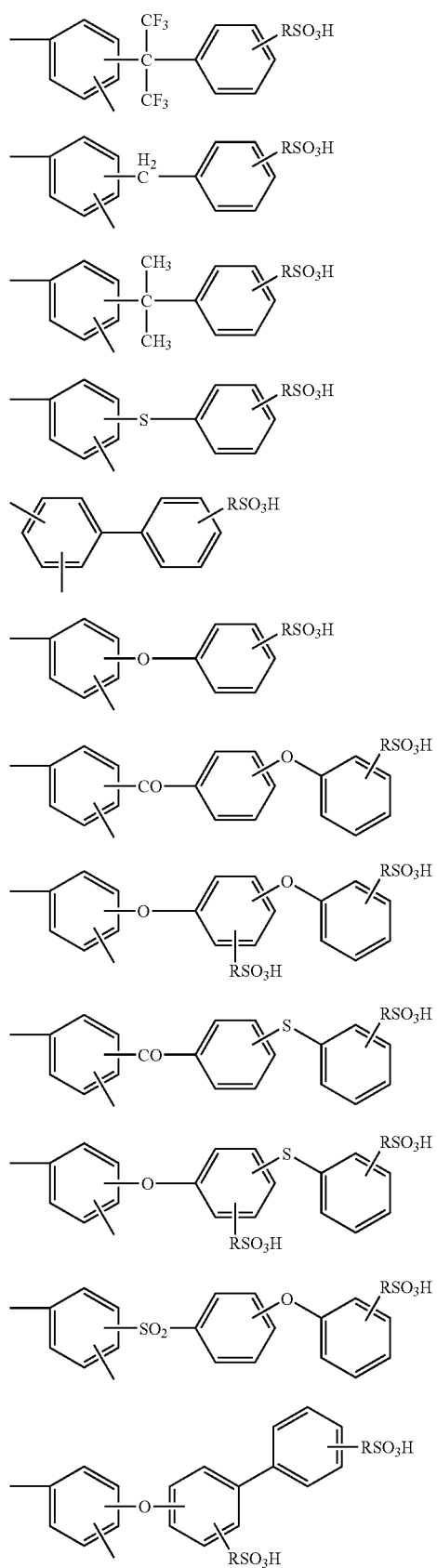

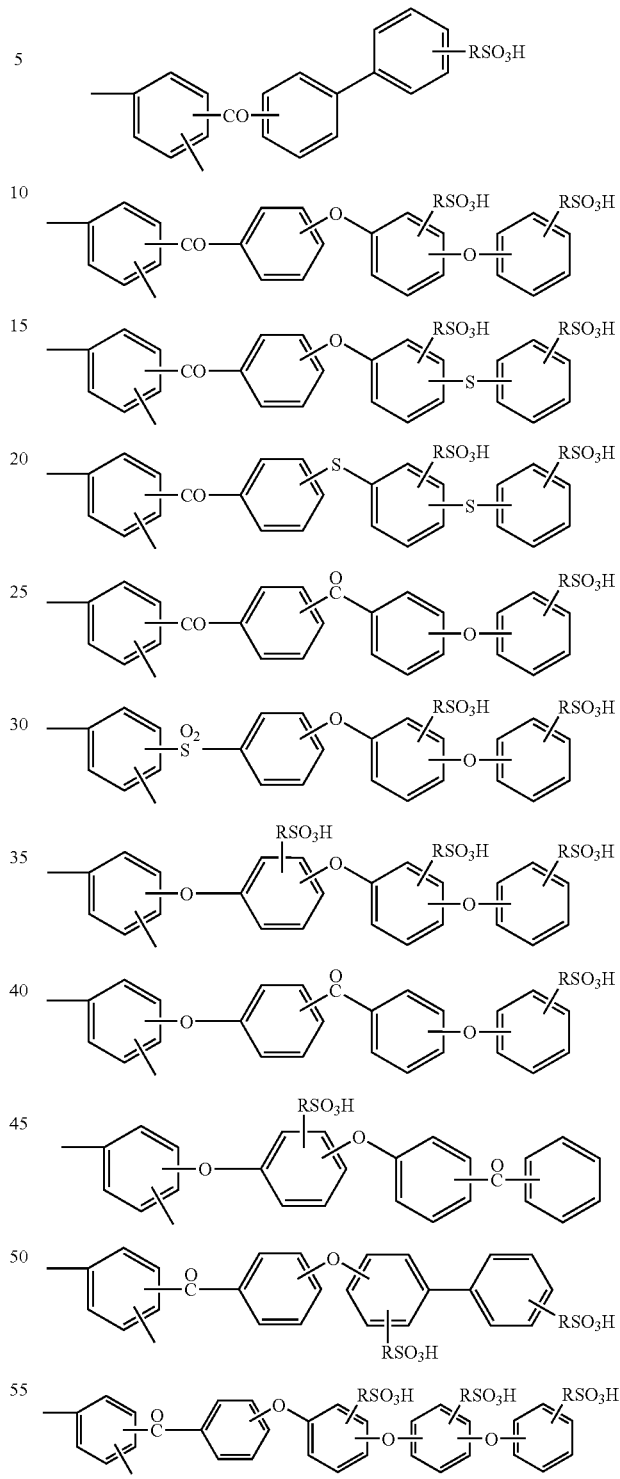

Preferably, the sulfonated polymer for use in the invention will contain the repeating structural unit of the formula (1) in an amount of, although not particularly limited to, 0.5 to 50 mol %, more preferably 1 to 49 mol %, and even more preferably 2 to 45 mol % of the total of the structural units (the repeating structural unit of the formula (1) plus the specific repeating structural unit).

When the content of the repeating structural unit (1) is within the above range, the polymer electrolyte will have excellent proton conductivity, hot water resistance and Fenton's reagent resistance (radical resistance) with a good balance. If the content falls below the lower limit, the proton conductivity will be too low for practical performance. The content exceeding the upper limit will result in lowered hot water resistance and Fenton's reagent resistance (radical resistance).

The sulfonated polymer for use in the invention may be synthesized by copolymerizing a monomer having the structural unit (1) with a monomer having the specific structural unit.

prising the structural unit (1) should be conventional conditions and common functional groups that are applicable also to the synthesis of the specific repeating structural unit (polymer).

For example, polyethersulfone having the repeating structural unit (1) may be synthesized, as illustrated below, by the reactions in which:

sodium salt of 4,4'-dihydroxy diphenyl sulfone, 4,4'-dichlorodiphenyl sulfone and 2,5-dichloro(4-phenoxybenzophenone) are copolymerized at high temperatures to form a polyethersulfone copolymer; and the polyethersulfone copolymer is sulfonated.

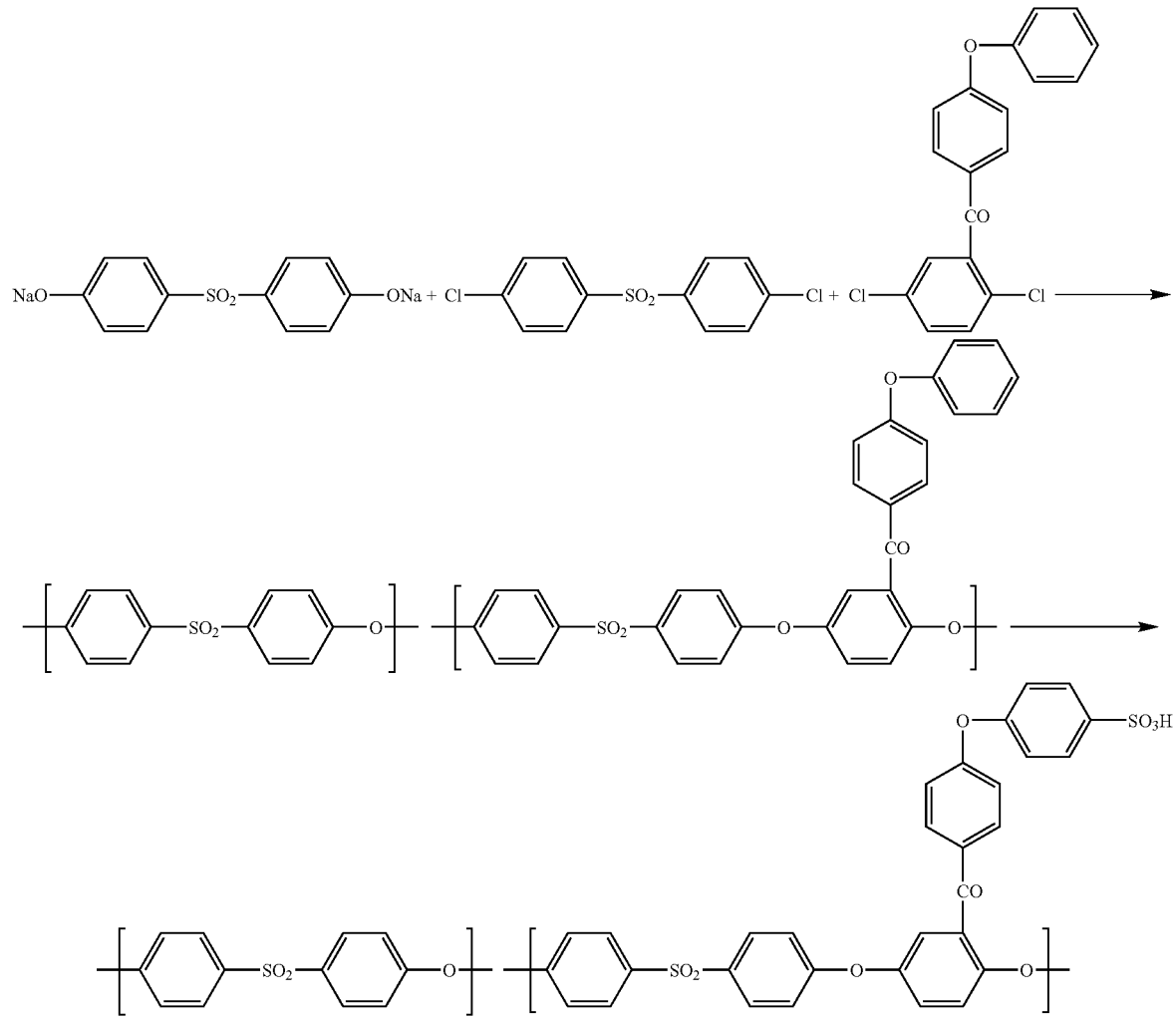

Alternatively, a polymer that comprises the structural unit (1) without the sulfonic groups and the specific structural unit may be sulfonated to give the sulfonated polymer.

Herein, the term "sulfonated (co)polymer" means that the sulfonic acid groups are inherently contained or chemically introduced in the (co)polymer.

The reaction conditions in the synthesis of the sulfonated polymer and the functional groups of the monomer com- Also, polybenzimidazole having the repeating structural unit (1) may be synthesized, as illustrated below, by condensing a tetraamine compound such as 3,3'-diaminobenzidine, a dicarboxylic acid such as isophthalic acid and a dicarboxylic acid derivative having the sodium sulfonate group at high temperatures in the presence of polyphosphoric acid and phosphorous pentoxide.

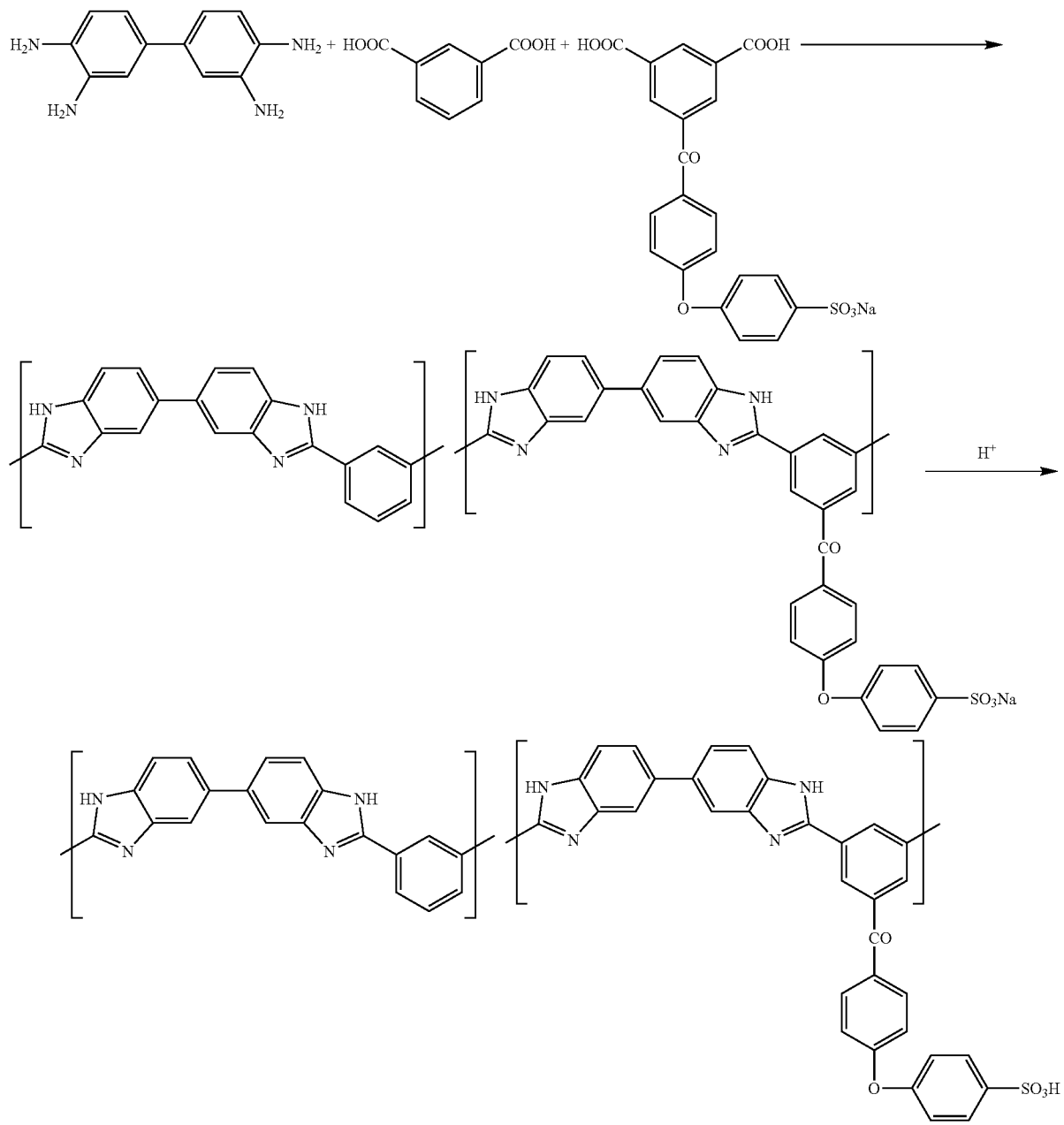

Solvents useful in the synthesis of the sulfonated polymer include tetrahydrofuran, cyclohexanone, dimethylsulfoxide, N,N-dimethylformamide, N,N-dimethylacetamide, N-methyl-2-pyrrolidone, γ-butyrolactone, sulfolane, γ-butyrolactam, dimethylimidazolidinone, tetramethylurea, nitrobenzene, benzonitrile, methanesulfonic acid and polyphosphoric acid.

The sulfonated polymer contains the sulfonic acid group in an amount of 0.3 to 5 meq/g, preferably 0.5 to 3 meq/g, and more preferably 0.8 to 2.8 meq/g. The sulfonic acid group content less than 0.3 meq/g leads to insufficient proton conductivity. Contrary, when the sulfonic group content exceeds 5 meq/g, hydrophilicity is so increased that the water resistance is greatly lowered.

The sulfonated polymer has a weight-average molecular weight of 5,000 to 10,000,000, preferably 10,000 to 1,000,000, and more preferably 20,000 to 800,000, in terms of polystyrene. When the weight-average molecular weight is less than 5,000, the sulfonated polymer will produce electrolyte membranes having cracks and poor mechanical strength. On the other hand, with the weight-average molecular weight over 10,000,000, the polymer electrolyte will have insufficient solubility, high melt viscosity and poor processability so that the production of membrane suffers troubles.

The sulfonic acid group content may be controlled by altering the proportion between the monomers having the specific repeating structural unit and the structural unit (1) or by changing the type or combination of the monomers.

The polymer electrolyte according to the invention comprises the aforementioned sulfonated polymer. The proton conductive membrane of the invention comprises the polymer electrolyte. In the production of the proton conductive membrane from the polymer electrolyte, an inorganic acid such as sulfuric acid or phosphoric acid, an organic acid containing carboxylic acid, an appropriate amount of water, etc. may be used with the polymer electrolyte.

For example, the proton conductive membrane may be produced by a casting method in which the polymer electrolyte dissolved in a solvent is flow-cast over a substrate to form a film. The substrate used herein is not particularly limited and may be selected from those substrates commonly used in the solution casting methods. Examples thereof include plastic substrates and metal substrates. Preferably, thermoplastic resin substrates such as polyethyleneterephthalate (PET) films are used.

The solvents to dissolve the polymer electrolyte include polar solvents such as N-methyl-2-pyrrolidone (NMP), N,N-dimethylformamide, γ-butyrolactone, N,N-dimethylacetamide, dimethylsulfoxide, dimethylurea, dimethylimidazolidinone, sulfolane, methylene chloride, chloroform and tetrahydrofuran (THF). These solvents may be used singly or in combination of two or more kinds.

The solvent for dissolving the polymer electrolyte may be a mixed solvent of the above polar solvent and an alcohol. Exemplary alcohols include methanol, ethanol, propyl alcohol, isopropyl alcohol, sec-butyl alcohol and tert-butyl alcohol. In particular, methanol is preferable since it ensures an appropriately low solution viscosity over a wide range of proportions of the polymer. These alcohols may be used singly or in combination of two or more kinds.

The above mixed solvent will contain the polar solvent in an amount of 95 to 25 wt %, and preferably 90 to 25 wt %, and the alcohol in an amount of 5 to 75 wt %, and preferably 10 to 75 wt % (the total of these two is 100 wt %). This proportion of the alcohol leads to an appropriately low solution viscosity.

Although the concentration of the polymer electrolyte in the solution (i.e. the polymer concentration) depends on the molecular weight of the sulfonated polymer constituting the polymer electrolyte, it is generally between 5 and 40 wt %, and preferably between 7 and 25 wt %. The polymer concentration less than 5 wt % causes difficulties in producing the membrane in large thickness and results in easy occurrence of pinholes. On the other hand, when the polymer concentration goes over 40 wt %, the solution viscosity becomes so high that the film production will be difficult and further that the obtained film may have low surface smoothness.

The solution viscosity may vary depending on the molecular weight of the sulfonated polymer constituting the polymer electrolyte or the polymer concentration. Generally, it is between 2,000 and 100,000 mPa·s, and preferably between 3,000 and 50,000 mPa·s. When the viscosity is less than 2,000 mPa·s, the solution will have too high a fluidity and may spill out of the substrate during the membrane production. On the contrary, the viscosity over 100,000 mPa·s is so high that the solution cannot be extruded through a die and the flow-casting for the film production may be difficult.

The wet film obtained as above may be soaked into water to substitute the remaining organic solvent in the film with water. The amount of the residual solvent in the proton conductive membrane can be reduced by this treatment.

Prior to the soak into water, the wet film may be predried. The predrying may be carried out by maintaining the wet film at 50 to 150° C. for 0.1 to 10 hours.

Soaking the wet films in water may be carried out batchwise with respect to each sheet, or may be a continuous process where the films, which may be in the original form of laminate with a substrate film (e.g. PET film) as produced or which may be released from the substrate, are soaked in water and then wound sequentially.

In the batchwise soaking, the films are suitably framed or fixed by similar means to prevent wrinkles from forming on the surface of treated films.

The soaking should be suitably made so that the wet films would contact with water that is at least 10 parts by weight, and preferably at least 30 parts by weight based on 1 part by weight of the wet films. This contact ratio is suitably set as large as possible to minimize the amount of solvent remaining in the proton conductive membrane. For the purpose of reducing the residual solvent amount, it is also effective to keep the concentration of the organic solvent in water at or below a certain level by renewing the water used in the soaking or by letting the water overflow. The in-plane distribution of the organic solvent within the proton conductive membrane may be effectively uniformed by homogenizing the organic solvent concentration in the water by stirring or the like.

When the wet film is soaked in water, the water preferably has a temperature of 5 to 80° C. Although the substitution between the organic solvent and water can take place at a higher rate as the water temperature rises, the water absorption in the film will also increase at higher temperatures. Accordingly, there is a concern that the proton conductive membrane has a rough surface after dried. In general, the water temperature is suitably between 10 and 60° C. from the viewpoints of the substitution rate and handling properties.

The soaking time varies depending on the initial amount of residual solvent, the water-solvent contact ratio and the water temperature. Generally, the soaking time ranges from 10 minutes to 240 hours, and preferably from 30 minutes to 100 hours.

When the water-soaked film is dried, the proton conductive membrane having a reduced amount of remaining solvent, which is generally 5 wt % or less, is obtained.

Controlling the soaking conditions enables reduction of the residual solvent down to 1 wt % or less of the proton conductive membrane. For example, this is possible when the wet film is soaked in water that is at least 50 parts by weight based on 1 part by weight of the wet film at a water temperature of 10 to 60° C. for 10 minutes to 10 hours.

After the wet film has been soaked in water as described above, the film will be dried at 30 to 100° C., preferably 50 to 80° C., for 10 to 180 minutes, preferably 15 to 60 minutes. Subsequently, it will be dried in vacuo at 50 to 150° C. and preferably at 500 to 0.1 mmHg for 0.5 to 24 hours. The proton conductive membrane according to the invention may be thus obtained.

The proton conductive membrane obtained as described above will range in dry thickness from 10 to 100 μm, and preferably from 20 to 80 μm.

The proton conductive membrane may contain an anti-aging agent, preferably a hindered phenol compound with a molecular weight of not less than 500. Containing such an anti-aging agent, the proton conductive membrane can exhibit improved service durability.

The hindered phenol compounds employable in the invention whose molecular weight is 500 or more include triethyleneglycol-bis[3-(3-t-butyl-5-methyl-4-hydroxyphenyl)propionate] (trade name: IRGANOX 245), 1,6-hexanediol-bis[3-(3,5-di-t-butyl-4-hydroxyphenyl) propionate] (trade name: IRGANOX 259), 2,4-bis-(n-octylthio)-6-(4-hydroxy-3,5-di-t-butylanilino)-3,5-triadine (trade name: IRGANOX 565), pentaerythrithyl-tetrakis[3-(3,5-di-t-butyl-4-hydroxyphenyl)propionate] (trade name: IRGANOX 1010), 2,2-thio-diethylene bis[3-(3,5-di-t-butyl-4-hydroxyphenyl)propionate] (trade name: IRGANOX 1035), octadecyl-3-(3,5-di-t-butyl-4-hydroxyphenyl)propionate] (trade name: IRGANOX 1076), N,N-hexamethylenebis (3,5-di-t-butyl-4-hydroxy-hydrocinnamide) (trade name: IRGANOX 1098), 1,3,5-trimethyl-2,4,6-tris(3,5-di-t-butyl-4-hydroxybenzyl) benzene (trade name: IRGANOX 1330), tris-(3,5-di-t-butyl-4-hydroxybenzyl)-isocyanurate (trade name: IRGANOX 3114) and 3,9-bis[2-[3-(3-t-butyl-4-hydroxy-5-methylphenyl)propionyloxy]-1,1-dimethylethyl]-2,4,8,10-tetraoxaspiro [5,5] undecane (trade name: Sumilizer GA-80).

The hindered phenol compound with 500 or more molecular weight will preferably be used in an amount of 0.01 to 10 parts by weight based on 100 parts by weight of the polymer electrolyte.

The proton conductive membrane of the invention can be used as electrolytes for primary and secondary batteries, solid polymer electrolytes for fuel cells and other proton conductive membranes for display elements, sensors, signaling media, solid condensers and ion exchange membranes.

In the membrane-electrode assembly according to the present invention, the aforesaid proton conductive membrane is sandwiched between an oxygen electrode and a fuel electrode. The oxygen and the fuel electrodes each have a diffusion layer and a catalyst layer formed on the diffusion layer. The catalyst layers form interfaces with the polymer electrolyte membrane.

The diffusion layers generally consist of carbon paper and a substrate layer.

The substrate layer may be formed on carbon paper by a series of steps in which a uniform slurry of given amounts of carbon black and polytetrafluoroethylene (PTFE) in an organic solvent such as ethylene glycol, is applied to a surface of carbon paper and the resultant coating is dried.

The catalyst layer may be formed on the substrate layer of the diffusion layer by coating it with a uniform catalyst paste that contains platinum carried on carbon black particles in a given weight ratio and an ion conductive binder, and drying the resultant coating.

The proton conductive membrane and the oxygen and the fuel electrodes are hot pressed to give the membrane-electrode assembly of the present invention.

EXAMPLE

The present invention will be hereinafter described in detail by the following Examples, but it should be construed that the invention is in no way limited to those Examples.

In the Examples, the equivalent weight of sulfonic acid, the proton conductivity, the hot water resistance (change in filmweight) and the weight retention in Fenton's reaction test were measured in the following manners.

1. Equivalent Weight of Sulfonic Acid

The polymer electrolyte was washed with water until neutrality was reached in the used wash water. Thereafter, the residual free acids were removed. Subsequently, the polymer was sufficiently washed with water and then dried. A given amount of the polymer was weighed out and dissolved in a THF/water mixed solvent. The solution thus obtained was titrated using a standard solution of NaOH. In the titration, phenolphthalein was used as an indicator. The equivalent weight of sulfonic acid was obtained by completeness of neutralization.

2. Measurement of Proton Conductivity

A 5 mm-wide strip specimen of the proton conductive membrane, holding 5 platinum wires ($\phi$=0.5 mm) at intervals of 5 mm on its surface, was placed in a thermo-hygrostat. Then the alternating current impedance between the platinum wires was measured at 85° C., 90% RH and 10 kHz. This measurement was carried out using a chemical impedance measuring system (NF Corporation) and thermo-hygrostat JW241 (Yamato Science Co., Ltd.). The alternating current resistance was measured in each case where the interwire distance was changed from 5 mm to 20 mm among the 5 platinum wires. The resistivity of the membrane was calculated by the following formula from a gradient between the interwire distance and the resistance. The reciprocal number of resistivity was obtained as the alternating current impedance, from which the proton conductivity was calculated.

$$\text{Resistivity R } (\Omega \cdot cm) = 0.5 \text{ (cm)} \times \text{membrane thickness (cm)} \times \text{resistance/interwire distance gradient } (\Omega cm)$$

3. Hot Water Resistance

A specimen film of the proton conductive membrane was soaked in ion exchange water at 95° C. After 48 hours of soaking, the change in film weight (in absolute dry condition) was obtained to evaluate the hot water resistance.

4. Fenton's Reaction Test

To prepare a Fenton's reagent, iron sulfate heptahydrate was added to a 3-wt % hydrogen peroxide aqueous solution to achieve an iron ion concentration of 20 ppm. Of the Fenton's reagent thus prepared, a 200 g portion was introduced into a 250 cc polyethylene container. Subsequently, a 3×4 cm proton conductive membrane having a thickness of 55 μm was placed in the container. The closed container was immersed for 30 hours in a liquid bath temperature controlled at 40° C.

After the 30-hour Fenton's reaction test, the weight retention was calculated from the following formula. Prior to the weight measurement, the film was vacuum dried to an absolute dry state.

$$\text{Weight retention (\%)} = \frac{\text{Film weight after the Fenton's reaction test}}{\text{Film weight before the Fenton's reaction test}} \times 100$$

The proton conductive membrane used in the above measurements was prepared as described below. First, a sulfonated polymer was dissolved in NMP in a proportion (solid content) of about 10 wt %. The resultant polymer varnish was applied on a glass substrate using a doctor blade, predried in an oven at 75° C. for 1 hour, and released from the glass substrate. The thus-formed film was fixed on an aluminum plate with a heat resistant tape and thereafter dried in an oven at 150° C. for 1 hour. Subsequently, the film was soaked for 2 hours in 25° C. ion exchange water of approximately 1000 times weight of the film in order to completely remove the NMP remaining in the film. After the residual solvent had been thus removed, the film was maintained at 25° C. and 50% RH for 12 hours for conditioning and tested to determine the aforesaid properties.

Example 1

A 1-L reactor equipped with a stirrer and a thermometer and containing 500 ml of sulfolane was charged with:

23.0 g (0.1 mol) of disodium salt of 4,4'-dihydroxybiphenyl;

14.4 g (0.05 mol) of dichlorodiphenyl sulfone; and 21.8 g (0.05 mol) of 2,5-dichloro-4'-(4-phenoxyphenoxy) benzophenone represented by the formula (14):

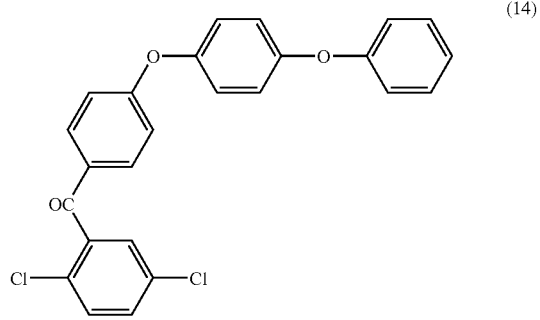

(14)

After those components were dissolved, the solution was brought to 260° C. and the reaction was carried out at the temperature for 10 hours. After the completion of the reaction, the solution was poured into a large amount of methanol to precipitate a polymer. The polymer was filtered off and dried in vacuo at 80° C. for a day and a night. Thus, a polyetherethersulfone copolymer was obtained.

A 50 g portion of the polyetherethersulfone copolymer was introduced into a 500 ml reactor equipped with a stirrer, a thermometer and a nitrogen induction tube. Then the copolymer was dissolved in 250 ml of 96.5 wt % concentrated sulfuric acid in a stream of nitrogen. The reaction was carried out at room temperature for 24 hours and the copolymer was sulfonated as a result.

After the sulfonation, the polymer solution was poured into a large amount of ion exchange water to precipitate the polymer. The polymer was then recovered and ground by a mixer. Thereafter, the ground polymer was washed with ion exchange water until the pH of the used wash water became 5 or more.

The washed copolymer was blow dried at 80° C. for a day and a night to give a polymer electrolyte comprising the sulfonated polyetherethersulfone copolymer.

The polymer electrolyte had a sulfonic acid equivalent weight of 1.8 meq/g, a weight retention of 99% as measured after the hot water treatment, and a weight retention of 70% as measured after the Fenton's reaction test. Its proton conductivity was found to be 0.116 s/cm.

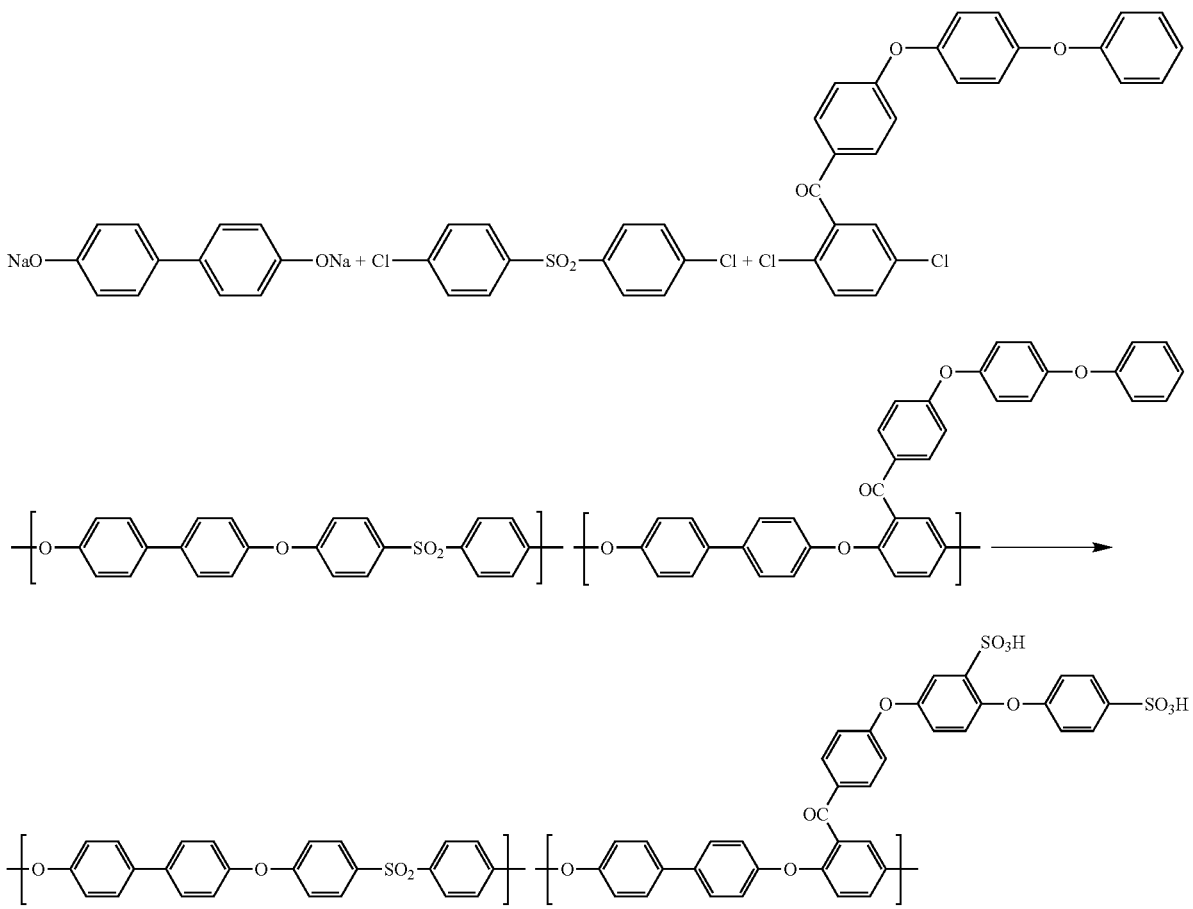

The proton conductive membrane prepared as described above was sandwiched between an oxygen electrode and a fuel electrode, and these were hot pressed several times, each for 2 minutes, at 80 to 180° C. and 5 MPa. A membrane-electrode assembly was thus produced. The assembly was then operated as a cell by supplying air and pure hydrogen to the oxygen electrode and the fuel electrode respectively at a pressure of 100 kPa, a utilization factor of 50%, a relative humidity of 50% and a temperature of 85° C. to determine its electric potential at a current density of 0.2 A/cm². The assembly displayed satisfactory generating performance.

The oxygen and fuel electrodes used herein had been produced as follows:

carbon black and polytetrafluoroethylene (PTFE) particles were mixed in a weight ratio (carbon black:PTFE) of 4:6 and the mixture was uniformly dispersed in ethylene glycol to give a slurry; the slurry was applied to a surface of carbon paper and dried to form a substrate layer on the carbon paper, thus producing a diffusion layer consisting of the carbon paper and the substrate layer; and platinum particles carried on carbon black (furnace black) in 1:1 weight ratio were uniformly dispersed in an ion conductive binder with a weight ratio (particles:binder) of 8:5 to give a catalyst paste; subsequently the catalyst paste was applied to the substrate layer of the diffusion layer by screen printing technique in a platinum amount of 0.5 mg/cm² and then dried at 60° C. for 10 minutes and thereafter under reduced pressure at 120° C., thus forming an oxygen (or fuel) electrode.

Although Examples in the present invention utilized the aforesaid polymer electrolyte as ion conductive binder, a solution of commercial perfluoroalkylene sulfonic acid polymer compound (e.g. Nafion® available from DuPont) may also be used.

[Comparative Example 1]

A polymer electrolyte was obtained by the procedure illustrated in Example 1 except that 2,5-dichloro-4'-(4-phenoxyphenoxy)benzophenone was not used, dichlorodiphenyl sulfone was used in an amount of 28.8 g (0.1 mol), 97.6% concentrated sulfuric acid was used as the sulfonating agent, and the sulfonation was carried out for 40 hours.

The polymer electrolyte had a sulfonic acid equivalent weight of 1.8 meq/g, a weight retention of 55% as measured after the hot water treatment, and a weight retention of 5% as measured after the Fenton's reaction test. Its proton conductivity was found to be 1.03 s/cm.

Example 2

A 500 ml reactor equipped with a stirrer, a thermometer and a nitrogen induction tube was charged with:

17.05 g (80 mmol) of 4,6-diaminoresorcinol, dihydrochloride;

4.65 g (28 mmol) of terephthalic acid;

34.24 g (52 mmol) of disodium sulfonate represented by the formula (15);

72 g of polyphosphoric acid (phosphorous pentoxide content: 84%); and 28 g of phosphorous pentoxide.

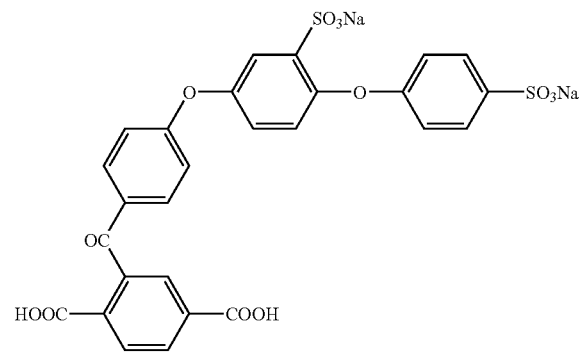

(15)

The contents were reacted in a stream of nitrogen at 70° C. for 5 hours, at 120° C. for 3 hours, at 130° C. for 15 hours, at 165° C. for 18 hours, and at 190° C. for 6 hours.

After the completion of the reaction, the polymer solution was poured into a large amount of ion exchange water to precipitate the polymer. The polymer was then recovered and ground. The ground polymer was washed with an excess of ion exchange water until the pH of the used wash water became 5 or more. The washed polymer was vacuum dried at 80° C. for a day and a night. Thus, a polybenzoxazole copolymer was obtained.

The polybenzoxazole copolymer electrolyte had a sulfonic acid equivalent weight of 2.5 meq/g, a weight retention of 95% as measured after the hot water treatment, and a weight retention of 60% as measured after the Fenton's reaction test. Its proton conductivity was found to be 0.28 s/cm.

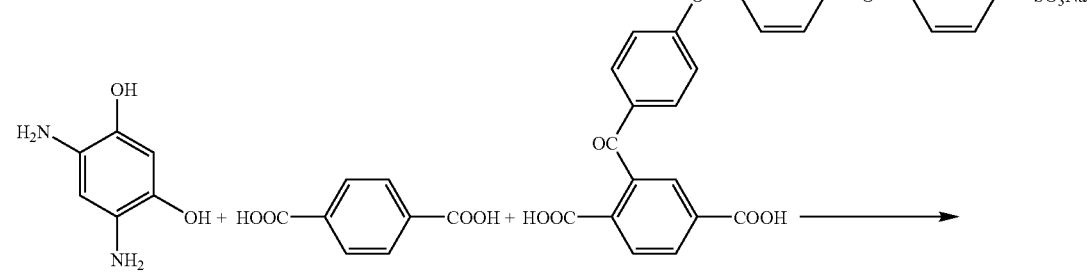

-continued

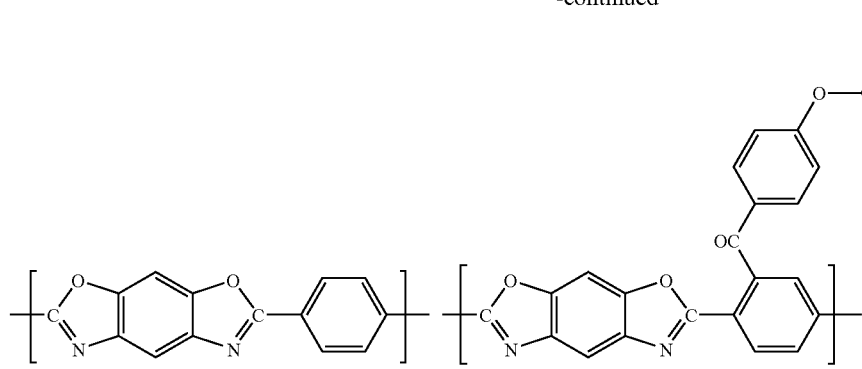

[Comparative Example 2]

A sulfonated polybenzoxazole copolymer electrolyte was obtained by the procedure illustrated in Example 2 except that disodium sulfonate represented by the formula (15) was not used, 17.05 g (80 mmol) of 4,6-diaminoresorcinol dihydrochloride, 15.02 g (56 mmol) of monosodium 2,5-dicarboxybenzenesulfonate, and 5.32 g (32 mmol) of terephthalic acid were used. The copolymer was tested by the methods described hereinabove.

The polymer electrolyte had a sulfonic acid equivalent weight of 2.5 meq/g, a weight retention of 40% as measured after the hot water treatment, and a weight retention of 2% as measured after the Fenton's reaction test. Its proton conductivity was found to be 0.26 s/cm.

EFFECT OF THE INVENTION

The polymer electrolyte according to the invention can be used to produce a solid polymer electrolyte membrane having excellent hot water resistance and radical resistance (service durability). The proton conductive membrane comprising the polymer electrolyte can be favorably used in fuel cells due to its high durability.

What is claimed is:

1. A polymer electrolyte comprising at least one polymer selected from the group consisting of polyimide, polyetherimide, polybenzothiazole, polybenzoxazole, polyhydantoin, polyquinoxaline, polyquinone, polyoxadiazole and polyparabanic acid;

said polymer comprising a repeating structural unit having one or both of an aromatic ring and a heterocyclic ring, and a repeating structural unit represented by the formula (1):

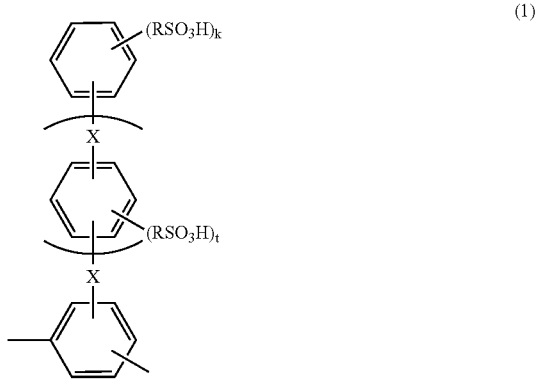

(1)

wherein X denotes a single bond, an electron-withdrawing group or an electron-donating group; R denotes a single bond or —$(CH_2)_q$— where q ranges from 1 to 10; m denotes an integer of 1 to 10 and when m is from 1 to 10 Xs may be the same as or different from one another; k denotes an integer of 0 to 5; l denotes an integer of 0 to 4; and $k+l \geq 1$.

2. The polymer electrolyte according to claim 1, containing the sulfonic acid group in an amount of 0.3 to 5.0 meq/g.

3. A proton conductive membrane comprising the polymer electrolyte as claimed in claim 1 or 2.

4. A membrane-electrode assembly in which an electrolyte membrane is sandwiched between a pair of electrodes, said electrolyte membrane comprising at least one polymer selected from the group consisting of polyimide, polyetherimide, polybenzothiazole, polybenzoxazole, polyhydantoin, polyquinoxaline, polyquinone, polyoxadiazole and polyparabanic acid, said polymer comprising a repeating structural unit having one or both of an aromatic ring and a heterocyclic ring, and a repeating structural unit represented by the formula (1):

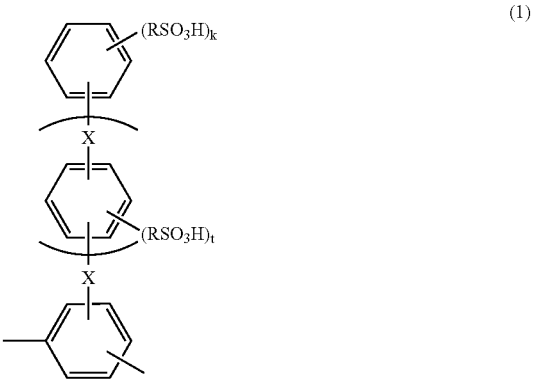

(1)

wherein X denotes a single bond, an electron-withdrawing group or, an electron-donating group; R denotes a single bond or —$(CH_2)_q$— where q ranges from 1 to 10; m denotes an integer of 1 to 10 and when m is from 1 to 10 Xs may be the same as or different from one another; k denotes an integer of 0 to 5; l denotes an integer of 0 to 4; and $k+l \geq 1$.

* * * * *